(12) United States Patent
Shen et al.

(10) Patent No.: US 10,997,481 B2
(45) Date of Patent: May 4, 2021

(54) SYSTEM AND METHOD FOR COLLECTING AND ANALYZING MULTI-FIELDS TWO-DIMENSIONAL CODE

(71) Applicant: GMEDIA CORPORATION, Grand Cayman (KY)

(72) Inventors: Wei Shen, Beijing (CN); Kaijun Cao, Beijing (CN); Hongqiang Zhang, Beijing (CN)

(73) Assignee: Gmedia Corporation, George Town (KY)

( * ) Notice: Subject to any disclaimer, the term of this patent is extended or adjusted under 35 U.S.C. 154(b) by 0 days.

(21) Appl. No.: 16/809,215

(22) Filed: Mar. 4, 2020

(65) Prior Publication Data
US 2020/0210794 A1    Jul. 2, 2020

Related U.S. Application Data

(63) Continuation of application No. 11/958,924, filed on Dec. 18, 2007, now Pat. No. 10,635,957.

(30) Foreign Application Priority Data
Dec. 25, 2006   (CN) .......................... 200610168072.2

(51) Int. Cl.
G06K 19/06    (2006.01)
G06K 7/14     (2006.01)

(52) U.S. Cl.
CPC ......... *G06K 19/06037* (2013.01); *G06K 7/14* (2013.01)

(58) Field of Classification Search
CPC .......................... G06K 19/06037; G06K 7/14
(Continued)

(56) References Cited

U.S. PATENT DOCUMENTS 5,311,000 A * 5/1994 Brooks .................. G06K 7/14
                                                    235/462.16
5,602,382 A * 2/1997 Ulvr ...................... B07C 3/18
                                                    235/375
(Continued)

FOREIGN PATENT DOCUMENTS

CN          1632811 A      6/2005

OTHER PUBLICATIONS

Non-Final Office Action dated Sep. 22, 2009, issued in related U.S. Appl. No. 11/958,924 (16 pages).
(Continued)

*Primary Examiner* — Michael G Lee
*Assistant Examiner* — David Tardif
(74) *Attorney, Agent, or Firm* — Sheppard Mullin Richter & Hampton LLP (57) ABSTRACT

The present invention provides systems and methods capable of collecting and analyzing a multi-fields two-dimensional code. A computer-implemented method of analyzing multi-fields two-dimensional code, comprises: receiving decoded multi-fields two dimensional code; identifying a first field and a second field from the decoded multi-fields two dimensional code; and determining whether the first field of the multi-fields two-dimensional code matches one of multiple pieces of pre-stored first information and whether the second field of the multi-fields two-dimensional code has ever been collected before, for providing a result with respect to the decoded multi-fields two dimensional code.

20 Claims, 6 Drawing Sheets

(58) Field of Classification Search
USPC ........................................................ 235/460
See application file for complete search history.

(56) References Cited

U.S. PATENT DOCUMENTS

| | | | | |
|---|---|---|---|---|
| 5,920,062 | A * | 7/1999 | Williams | G06K 7/1434 |
| | | | | 235/462.08 |
| 6,006,990 | A * | 12/1999 | Ye | G06K 7/10722 |
| | | | | 235/454 |
| 6,006,992 | A * | 12/1999 | Watanabe | G06K 7/10 |
| | | | | 235/462.12 |
| 6,098,892 | A * | 8/2000 | Peoples, Jr. | G06K 7/14 |
| | | | | 235/494 |
| 2002/0158128 | A1* | 10/2002 | Ashiura | G06K 7/14 |
| | | | | 235/462.01 |
| 2003/0094494 | A1* | 5/2003 | Blanford | G06K 7/14 |
| | | | | 235/462.07 |
| 2004/0227000 | A1* | 11/2004 | Behm | A23J 1/14 |
| | | | | 235/487 |
| 2005/0059339 | A1* | 3/2005 | Honda | G06Q 30/06 |
| | | | | 455/3.01 |
| 2005/0199724 | A1* | 9/2005 | Lubow | G06K 19/06018 |
| | | | | 235/462.01 |
| 2006/0118631 | A1* | 6/2006 | Lubow | G06K 19/06037 |
| | | | | 235/462.01 |
| 2008/0103850 | A1 | 5/2008 | Shen | |
| 2008/0149719 | A1 | 6/2008 | Shen et al. | |

OTHER PUBLICATIONS

Non-Final Office Action dated Aug. 8, 2019, issued in related U.S. Appl. No. 11/958,924 (17 pages).

\* cited by examiner

FIG. 1

DM Code

FIG.2a

| 0 | 1 | 2 | 3 | 4 | 5 | 6 | 7 | 8 | 9 | 10 | 11 | 12 | 13 | 14 | 15 |

SYSTEM AND METHOD FOR COLLECTING AND ANALYZING MULTI-FIELDS TWO-DIMENSIONAL CODE

CROSS-REFERENCE TO RELATED APPLICATIONS

The present application is a continuation application of U.S. patent application Ser. No. 11/958,924, filed on Dec. 18, 2007, and entitled "SYSTEM AND METHOD FOR COLLECTING AND ANALYZING MULTI-FIELDS TWO-DIMENSIONAL CODE," which is based on and claims priority to Chinese Patent Application No. 200610168072.2, filed on Dec. 25, 2006. All of the above-referenced applications are incorporated herein by reference in their entirety.

TECHNICAL FIELD

The present invention generally relates to collecting and analyzing two-dimensional code, and more particularly, to a system and a method for collecting and analyzing two-dimensional code by using a mobile terminal.

BACKGROUND

Two-dimensional code is a new coding scheme developed recently, which is to record data and symbol signals by arranging certain particular geometrical graphics on a plane (two-dimension directions) according to a specific rule. Since it may represent information both horizontally and vertically at the same time, the two-dimensional code has the characteristics of high coding density, large information capacity, wide coding range, strong error-correcting ability, high decoding reliability, good security, low cost and the like. Due to above advantages, the two-dimensional code is being widely employed in fields such as logistics, ID verification, rapid data entry in printed form or by transmission via a network.

As continuous development and wider use of Internet technologies and wireless communication technologies, the currently employed two-dimensional reading and processing devices are no longer suitable for fast, accurate, networked and intelligent applications for very large amount of uses in large geographical scope. Current two-dimensional code is typically published and used by one entity (for example, a nationwide enterprise), and only includes information associated with the entity, database and devices associated thereof are commonly purpose-specific or separated. That different entities independently use their own two-dimensional codes, encryption systems, and even devices, is not only cumbersome for the interaction and cooperation between these entities, but also causes repeat and waste of network resource and computation resource, and at the same time will slow down the processing speed.

Therefore, there is need for flexible system and method of collecting and analyzing two-dimensional code which save network resource, storage space and computation resource. The system and method of collecting and analyzing two-dimensional code proposed in the present invention will meet the need.

The single-field two-dimensional code termed in the present invention refers to a two-dimensional code including information related to one entity (part) only, for example, associated information about one enterprise and products thereof. The multi-fields two-dimensional code termed in the present invention refers to a two-dimensional code including information related to more than one entity, for example, associated information about one enterprise and products thereof, and information about a second enterprise. The second enterprise may be a seller, promoter, depository, maintaining site, training site and the like of the products and services of the first enterprise. The more than one entity may together form a shared multi-fields two-dimensional code, for example, a shared multi-fields two-dimensional code may be encoded according to a contact or rule agreed by all entities. Those skilled in the art may understand that a multi-fields two dimensional code may include any number of entities including two entities, three entities, as long as there is enough capacity.

SUMMARY

In accordance with a first aspect of the present invention, a computer-implemented method of analyzing multi-fields two-dimensional code, comprises: receiving decoded multi-fields two dimensional code; identifying a first field and a second field from the decoded multi-fields two dimensional code; and determining whether the first field of the multi-fields two-dimensional code matches one of multiple pieces of pre-stored first information and whether the second field of the multi-fields two-dimensional code has ever been collected before, for providing a result with respect to the decoded multi-fields two dimensional code.

In some embodiments, the first field comprises information associated with a first part and a protocol of multiple protocols initialed by the first part, and the second field comprises information associated with at least one second part which is authorized by the first part to propagate the protocol of multiple protocols.

In some embodiments, the first field of the multi-fields two-dimensional code includes a first sub-field containing information associated with the protocol of the multiple protocols initialed by the first part and a second sub-field containing information associated with the first part.

In some embodiments, identifying a first field and a second field from the decoded multi-fields two dimensional code comprises: identifying the first field and the second field from the decoded multi-fields two dimensional code by applying an encryption arithmetic rule, a Hash arithmetic rule, a fields-distributing ratio rule, or a flag bit rule.

In some embodiments, determining whether the first field of the multi-fields two-dimensional code matches one of multiple pieces of pre-stored first information and whether the second field of the multi-fields two-dimensional code has ever been collected before, for providing a result with respect to the decoded multi-fields two dimensional code comprises: in response to determining that the first field of the multi-fields two-dimensional code matches one of multiple pieces of pre-stored first information, determining whether the second field of the multi-fields two-dimensional code has ever been collected before; and in response to determining that the second field of the multi-fields two-dimensional code has not ever been collected before, providing a first result with respect to the multi-fields two-dimensional code and recording the second field of the multi-fields two-dimensional code.

In some embodiments, the method further comprises: in response to determining that the second field of the multi-fields two-dimensional code has ever been collected before, providing a second result with respect to the multi-fields two-dimensional code.

In some embodiments, the result with respect to the decoded multi-fields two dimensional code indicates validity of the decoded multi-fields two dimensional code.

In accordance with a second aspect of the present invention, a computer-implemented method of collecting and analyzing multi-fields two-dimensional code is provided. The method comprises: collecting the multi-fields two dimensional code in an optical manner; decoding the collected multi-fields two dimensional code; identifying a first field and a second field from the decoded multi-fields two dimensional code; and determining whether the first field matches one of multiple pieces of pre-stored first information and whether the second field of the multi-fields two-dimensional code has ever been collected before, for displaying a result with respect to the multi-fields two-dimensional code.

In some embodiments, the first field comprises information associated with a first part and a protocol of multiple protocols initialed by the first part, and the second field comprises information associated with at least one second part which is authorized by the first part to propagate the protocol of the multiple protocols.

In some embodiments, the first field of the multi-fields two-dimensional code includes a first sub-field containing information associated with the protocol of the multiple protocols initialed by the first part and a second sub-field containing information associated with the first part.

In some embodiments, identifying a first field and a second field from the decoded multi-fields two dimensional code comprises: identifying the first field and the second field from the decoded multi-fields two dimensional code by applying an encryption arithmetic rule, a Hash arithmetic rule, a fields-distributing ratio rule, or a flag bit rule.

In some embodiments, the multiple pieces of pre-stored first information are locally stored. In other embodiments, the multiple pieces of pre-stored first information are obtained remotely via a network.

In some embodiments, determining whether the first field matches one of multiple pieces of pre-stored first information and whether the second field of the multi-fields two-dimensional code has ever been collected before, for displaying a result with respect to the multi-fields two-dimensional code comprises: in response to determining that the first field matches one of multiple pieces of pre-stored first information, determining whether the second field of the multi-fields two-dimensional code has ever been collected before; and in response to determining that the second field of the multi-fields two-dimensional code has not ever been collected before, displaying a first result with respect to the multi-fields two-dimensional code and recording the second field of the multi-fields two-dimensional code.

In some embodiments, the method further comprises: in response to determining that the second field of the multi-fields two-dimensional code has ever been collected before, displaying a second result with respect to the multi-fields two-dimensional code.

In some embodiments, the result with respect to the decoded multi-fields two dimensional code indicates validity of the decoded multi-fields two dimensional code.

In accordance with a third aspect of the present invention, an apparatus for collecting and analyzing multi-fields two-dimensional code, comprising: one or more processors and one or more memories coupled to the one or more processors and configured with instructions executable by the one or more processors to cause the apparatus to perform operations comprising: collecting the multi-fields two dimensional code in an optical manner; decoding the collected multi-fields two dimensional code; identifying the first field and the second field from the decoded multi-fields two dimensional code; and determining whether the first field matches one of multiple pieces of pre-stored first information and whether the second field of the multi-fields two-dimensional code has ever been collected before, for displaying a result with respect to the multi-fields two-dimensional code.

In accordance with a fourth aspect of the present invention, a system capable of collecting and analyzing a multi-fields two-dimensional code is provided, which comprises: at least one mobile terminal comprising a collecting module for collecting the multi-fields two dimensional code in an optical manner and a decoding module for decoding the collected multi-fields two dimensional code, wherein the multi-fields two-dimensional code includes at least a first field and a second field, wherein the first field comprises information associated with a first part and a protocol of multiple protocols initialed by the first part, and the second field comprises information associated with at least one second part which is authorized by the first part to propagate and/or carry out the protocol of the multiple protocols; and an identifying module for identifying the first and second fields from the decoded multi-fields two dimensional code by applying a predetermined rule. The mobile terminal may include the identifying module. The system further comprises a communication network and at least one server coupled with the communication network, the mobile terminal is coupled with the communication network and sends the identified first and second fields of the multi-fields two-dimensional code to the server via the communication network, wherein the server comprises a memory storing multiple pieces of first information associated with the first part and the multiple protocols, and an analyzing module for analyzing whether the received first field matches one of the multiple pieces of first information in the memory and whether the second field of the multi-fields two-dimensional code has been collected, if the first field is matched and the second filed has not been collected, the analyzing module gives out a corresponding first result and recording the second field, and if the first field is matched and the second field has been collected, the analyzing module gives out a corresponding second result.

In accordance with a fifth aspect of the present invention, a system capable of collecting and analyzing a multi-fields two-dimensional code is provided, which comprises: at least one mobile terminal comprising a collecting module for collecting the multi-fields two dimensional code in an optical manner and a decoding module for decoding the collected multi-fields two dimensional code, wherein the multi-fields two-dimensional code includes at least a first field and a second field, wherein the first field comprises information associated with a first part and a protocol of multiple protocols initialed by the first part, and the second field comprises information associated with at least one second part which is authorized by the first part to propagate and/or carry out the protocol of the multiple protocols; and an identifying module for identifying the first and second fields from the decoded multi-fields two dimensional code by applying a predetermined rule. The mobile terminal may include the identifying module. The mobile terminal further comprises a memory storing multiple pieces of first information associated with the first part and the multiple protocols, and an analyzing module for analyzing whether the received first field matches one of the multiple pieces of first information in the memory and whether the second field of the multi-fields two-dimensional code has been collected, if the first field is matched and the second field has not been collected, the analyzing module gives out a corresponding first result and recording the second field, and if the first field is matched and the second field has been collected, the analyzing module gives out a corresponding second result.

In accordance with a sixth aspect of the present invention, a system capable of collecting and analyzing a multi-fields two-dimensional code is provided, which comprises: at least one mobile terminal comprising a collecting module for collecting the multi-fields two dimensional code in an optical manner and a decoding module for decoding the collected multi-fields two dimensional code, wherein the multi-fields two-dimensional code includes at least a first field and a second field, wherein the first field comprises information associated with a first part and a protocol of multiple protocols initialed by the first part, and the second field comprises information associated with at least one second part which is authorized by the first part to propagate and/or carry out the protocol of the multiple protocols; and an identifying module for identifying the first and second fields from the decoded multi-fields two dimensional code by applying a predetermined rule. The system further comprises a communication network and at least one server coupled with the communication network, the mobile terminal is coupled with the communication network and sends the identified first and second fields of the multi-fields two-dimensional code to the server via the communication network, wherein the server comprises the identifying module, and the server further comprises a memory storing multiple pieces of first information associated with the first part and the multiple protocols, and an analyzing module for analyzing whether the received first field matches one of the multiple pieces of first information in the memory and whether the second field of the multi-fields two-dimensional code has been collected, if the first field is matched and the second field has not been collected, the analyzing module gives out a corresponding first result and recording the second field, and if the first field is matched and the second field has been collected, the analyzing module gives out a corresponding second result.

In accordance with a seventh aspect of the present invention, a method of collecting and analyzing a multi-fields two-dimensional code is provide, which comprises: collecting the multi-fields two dimensional code in an optical manner through at least one mobile terminal, wherein the multi-fields two-dimensional code includes at least a first field and a second field, wherein the first field comprises information associated with, a first part and a protocol of multiple protocols initialed by the first part, and the second field comprises information associated with at least one second part which is authorized by the first part to propagate and/or carry out the protocol of the multiple protocols; decoding the collected multi-fields two dimensional code; identifying the first and second fields from the decoded multi-fields two dimensional code by applying a predetermined rule; and analyzing whether the first field matches one of pre-stored multiple pieces of first information and whether the second field of the multi-fields two-dimensional code has been collected, if the first field is matched and the second field has not been collected, giving out a corresponding first result and recording the second field, and if the first field is matched and the second field has been collected, giving out a corresponding second result. The method further comprises displaying the first or second result. In the method, the pre-stored multiple pieces of first information may be locally stored, or may be obtained remotely via network.

In embodiments of the present invention, the predetermined rule includes encryption arithmetic, Hash arithmetic, fields-distributing ratio rule and flag bit rule, and so on. The first field of the multi-fields two-dimensional code includes a first sub-field containing information associated with the protocol of the multiple protocols initialed by the first part and a second sub-field containing information associated with the first part. The communication network includes Internet, Local area network, Wide area network, mobile Internet, wireless Local area network and the like. The communication between the mobile terminal and the server includes wire communication, wireless communication, infrared communication, Blue tooth, radio frequency, WiFi, WiMax and the like.

DESCRIPTION OF THE DRAWINGS

Embodiments of the invention are illustrated by way of example, and not by way of limitation, in the accompanying drawings.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein, in connection with one embodiment, may be implemented within other embodiments without departing from the spirit and scope of the invent. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
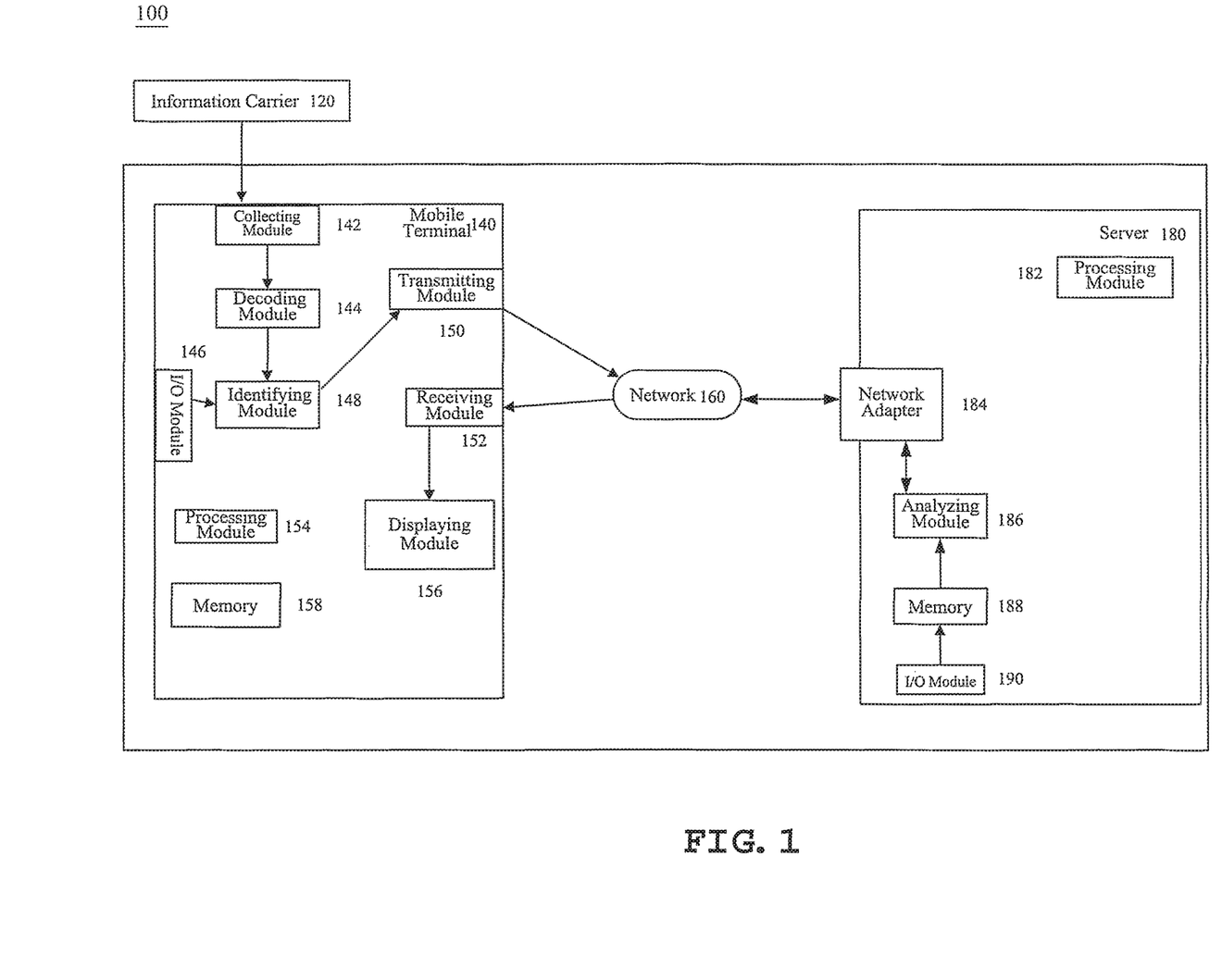
FIG. 1 illustrates a block diagram of a system 100 capable of collecting and analyzing a multi-fields two-dimensional code according to one embodiment of the present invention.

FIG. 1 illustrates a block diagram of a system 100 capable of collecting and analyzing a multi-fields two-dimensional code according to one embodiment of the present invention. As shown, the system 100 includes at least one mobile terminal 140, a communication network 160 and at least one server 180, wherein the mobile terminal 140 and the server 180 are both coupled to the communication network 160 so as to enable the mobile terminal 140 to be coupled to the server 180 in a communication-capable manner. The communication network 160 includes, but not limited to, Internet, Local area network, Wide area network, mobile Internet and wireless Local area network. The mobile terminal 140 comprises, but not limited to, mobile phone, Personal Digital Assistant (PDA), Tablet PC and notebook. The communication between the mobile terminal 140 and the server 180 includes, but not limited to, wire communication, wireless communication, infrared communication, Blue tooth, radio frequency, WiFi and WiMax. As further shown in FIG. 1, the mobile terminal 140 includes a processing module 154, a memory 158, a collecting module 142, a decoding module 144, an identifying module 148, a transmitting module 150, a receiving module 152, a displaying module 156 and an I/O (input/output) module 146. The server 180 includes well known elements such as a processing module 182 and a network adapter 184, an analyzing module 186, a memory 188 and an I/O module 190, wherein the memory 158 and the memory 188 include, but not limited to, internal memory, external memory, storage card, hard disk and externally attached storage device. In accordance with one example of the present invention, the collecting module 142 includes at least one CCD or CMOS camera. Those skilled in the art should understand that the construction of the above system is only for facilitating the description of the present invention and some of the above modules and elements may be combined as one module, for example, the transmitting module and the receiving module may be combined as a transceiving module.

First, the collecting module 142 collects an information carrier 120 (such as a multi-fields two dimensional code) into the mobile terminal 140 in an optical manner, and transfers the multi-fields two dimensional code to the decoding module 144, wherein the multi-fields two-dimensional code includes at least a first field and a second field, wherein the first field comprises information associated with a first part and a protocol of multiple protocols initialed by the first part, and the second field comprises information associated with at least one second part which is authorized by the first part to propagate and/or carry out the protocol of the multiple protocols, and wherein the first field includes a first sub-field containing information associated with the protocol of the multiple protocols initialed by the first part and a second sub-field containing information associated with the first part. Propagating includes, but not limited to, relaying, transferring, introducing, popularizing, promoting, and advertising and so on. In accordance with one example of the present invention, for example, the first sub-field may be information representing one of the protocols initialed by an enterprise about its product or service information•the second sub-field may be information representing the enterprise per se, and the second field may be information representing another enterprise which popularizing, promoting and/or carrying out the protocol. In accordance with an example of the present invention, the protocol may be, but not limited to, a popularizing protocol, a promoting protocol, a maintaining protocol, a preferential and reward protocol, a part delivering protocol and the like. Then the decoding module 144 decodes the collected multi-fields two-dimensional code and transfers the decoded result to the identifying module 148. The identifying module 148 identifies the first and the second fields from the decoded multi-fields two-dimensional code by applying a predetermined rule, and transfers the first and the second fields to the transmitting module 150, wherein the predetermined rule includes, but not limited to, encryption arithmetic, Hash arithmetic, fields-distributing ratio rule and flag bit rule. Additionally, these rules may be stored in the identifying module 148 as firmware, and in accordance with one embodiment, the identifying module 148 may be coupled to the input/output (I/O) module 146, and the rules stored therein may be modified, replaced, added or deleted through the I/O module 146.

Then, the mobile terminal 140 sends the first and the second fields to the server 180 respectively via the transmitting module 150. The above-mentioned information is transferred to the analyzing module 186 in the server 180 via the network adapter 184. Multiple pieces of first information associated with the first part and the multiple protocols are stored in the memory 188 of the server 180, and according to one embodiment of present invention, the memory 188 is coupled to the I/O module 190 of the server 180 so that the information stored therein may be modified, replaced, added or deleted through the I/O module 190.

The analyzing module 186 analyzes whether the received first field matches one of multiple pieces of first information in the memory 188. If it is matched, the analyzing module 186 further analyzes whether the second field has been collected. If it has not been collected, the analyzing module 186 correspondingly gives out a first result and records the second field, wherein the first result may be information representing the validity of the multi-fields two-dimensional code in accordance with an example of the present invention. If the second field has been collected, the analyzing module 186 correspondingly gives out a second result, wherein in accordance with an example of the present invention, the second result may be information representing that the multi-fields two-dimensional code has ever been used. In addition, the analyzing module 186 may further perform statistics and analysis on recorded second fields. Subsequently, the server 180 sends the first or second result to the receiving module 152 of the mobile terminal 140 via the communication network 160. After receiving the first or second result, the receiving module 152 transfers the received result to the displaying module 156 for displaying.

Figure 2A:
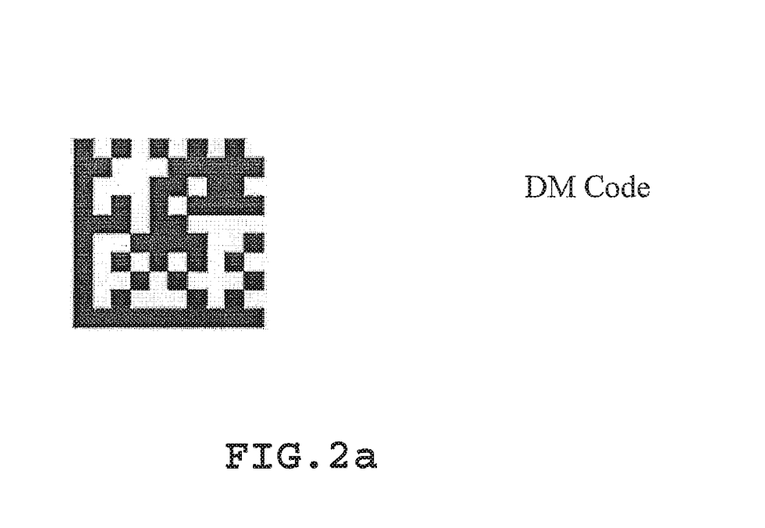
FIG. 2a shows one example of two-dimensional code.
Figure 2B:
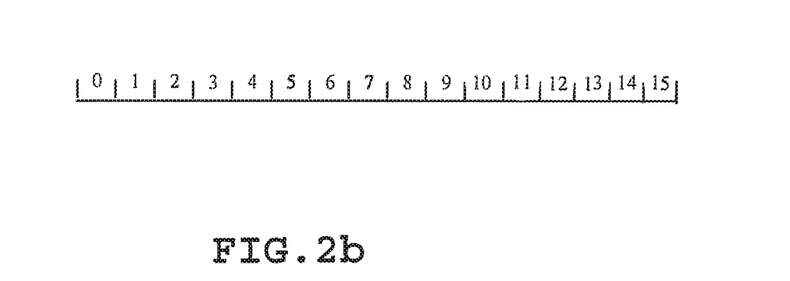
FIG. 2b illustrates one example of decoded multi-fields two-dimensional code.
Figure 2C:
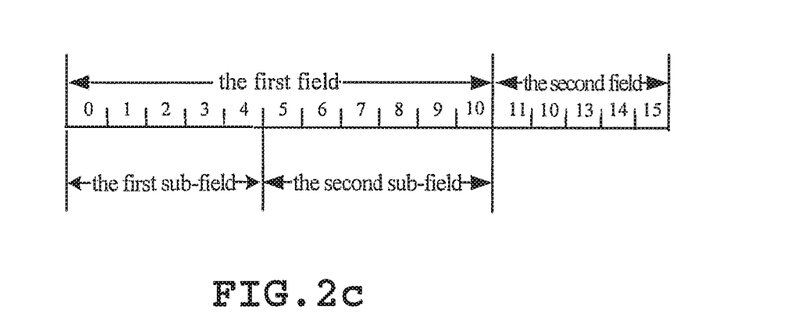
FIG. 2c shows examples of identified first and second fields by applying fields-distributing ratio rule.

Next, turn to FIGS. 2a-2c. FIG. 2a shows a DM (Data Matrix) code as one example of two-dimensional code. In Chinese patent application publication CN1632811 a variety of two-dimensional codes are also disclosed, and those skilled in the art may understand that two-dimensional codes of these types may be encoded into multi-fields two-dimensional codes applicable in the present invention.

FIG. 2b illustrates one example of a decoded multi-fields two-dimensional code. The decoded multi-fields two-dimensional code shown in this example is a piece of information comprised of 16 characters. Those skilled in the art should also understand that the decoding schemes associated with the above mentioned kinds of two-dimensional codes may be used to decode the multi-fields two-dimensional code of the present invention.

FIG. 2c shows examples of identified first and second fields by applying, for example, fields-distributing ratio rule according to one embodiment of the present invention. It should be noted that this is just for the purpose of illustration and the present invention is not limited in this aspect. The rule for identifying the first and second fields may be selected and designed according to requirement for security, computational complexity and storage requirement.

Figure 2D:
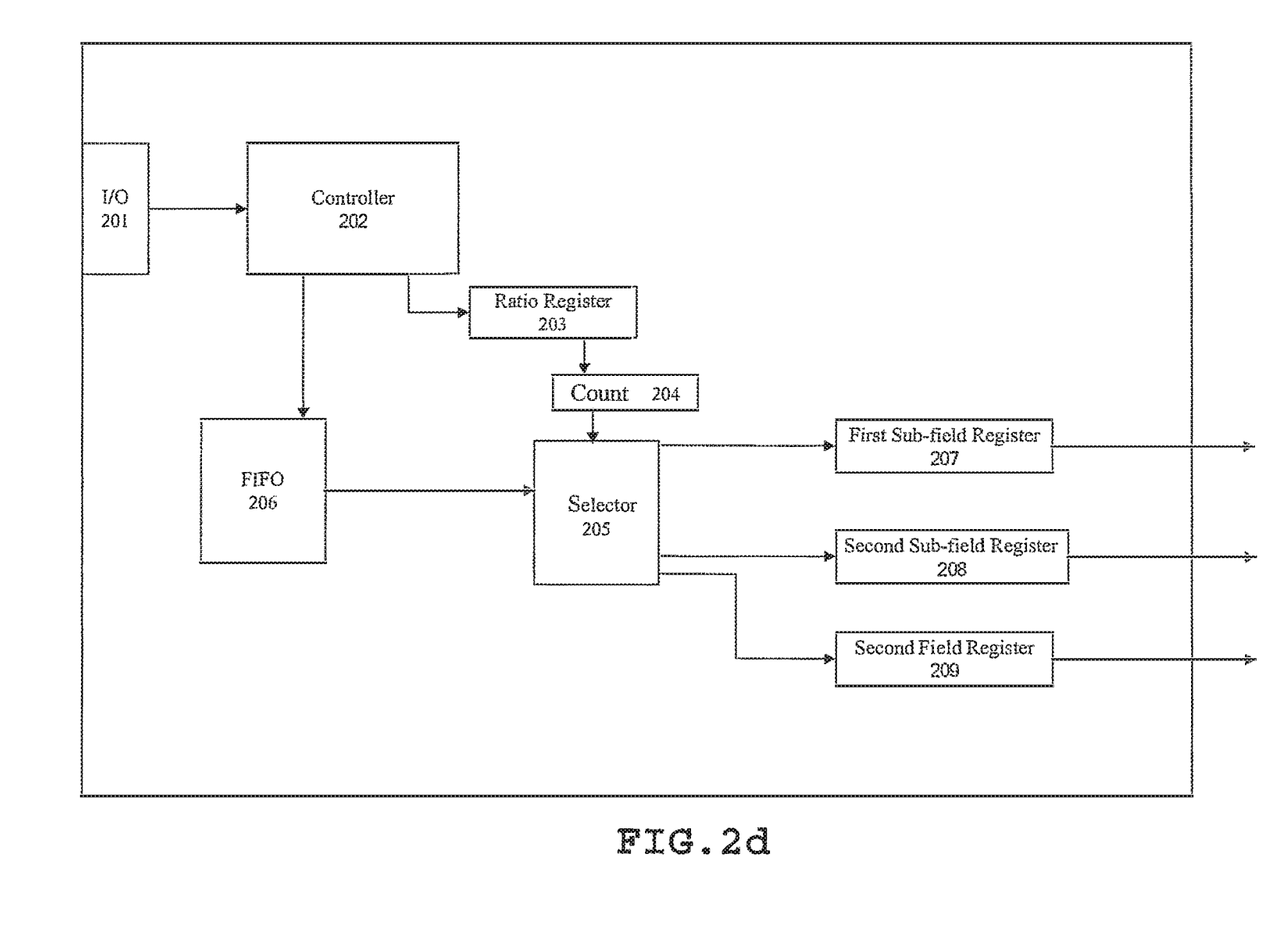
FIG. 2d illustrates an exemplary hardware implementation of an identifying module.

A hardware circuit for identifying multiple fields from a multi-fields two dimensional code according to the ratio rule is introduced below. FIG. 2d illustrates an exemplary hardware implementation of an identifying module. The identifying module includes a controller 202, a ratio register 203 for storing the ratio of fields distribution, a count 204, a selector 205, a FIFO (first in first out) 206, and a first sub-field register 207, a second sub-field register 208, a second field register 209 for storing individual fields respectively. The ratio register 203 regularly sends preset ratio to the count logic 204 under the control of the controller 202. As such, the count logic 204 is capable of sending different select signals to the selector 205 according to the preset ratio, so as to send the different fields of the decoded two-dimensional code to individual field registers. For example, if the ratio is 5:6:5, the count logic gives out select signals 00, 01, 10 respectively at the count values of 0, 5 and 11, respectively indicating the selector to select the first sub-field register 207, the second sub-field register 208 and the second field register 209, such that the selector stores the first five bits of the decoded two-dimensional code to the first sub-field register 207, the six bits in the middle to the second sub-field register 208, and the last five bits to the second field register 209. Furthermore, the identifying module may also include an I/O module 201 coupled with the controller 202, so a user may modify the ratio in the ratio register to accommodate different rules.

Figure 3:
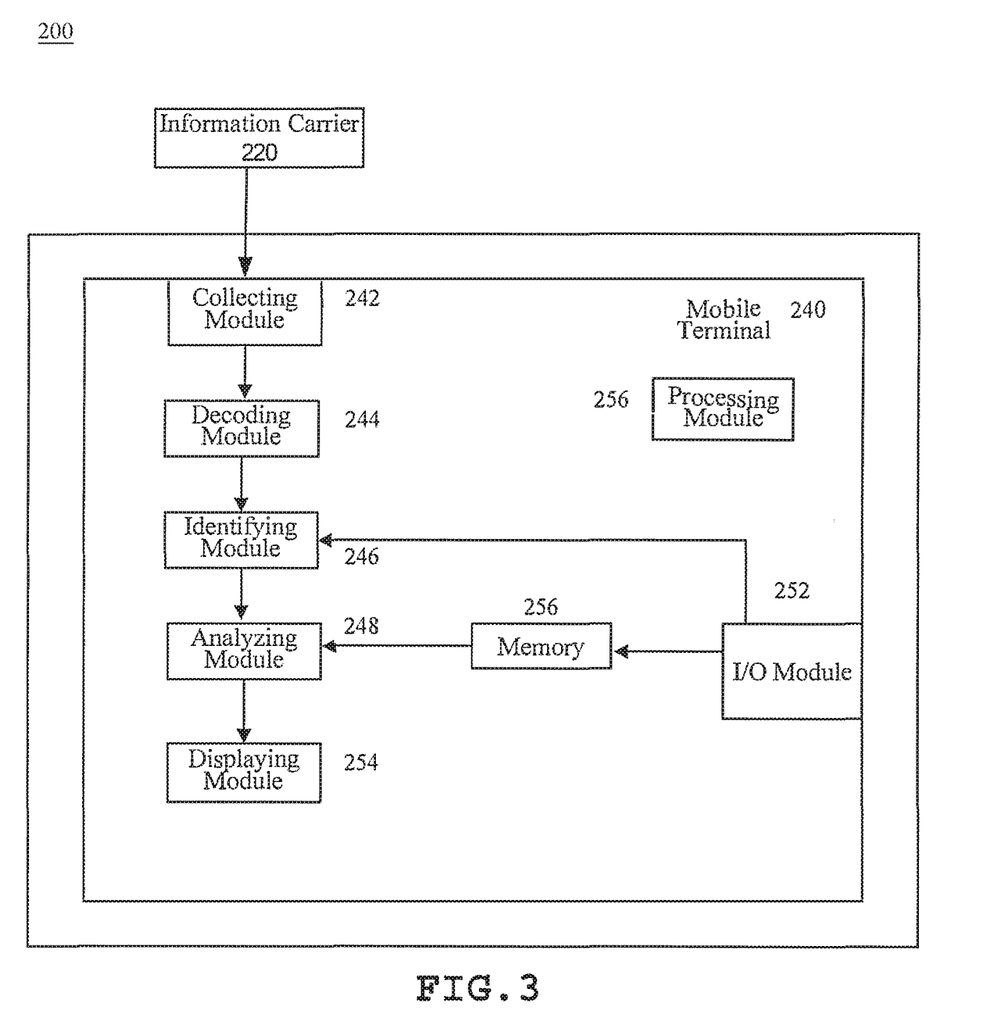
FIG. 3 shows a block diagram of a system 200 which is capable of collecting and analyzing a multi-fields two-dimensional code according to another embodiment of the present invention.

The following will refer to FIG. 3. As shown, FIG. 3 shows a block diagram of a system 200 which is capable of collecting and analyzing a multi-fields two-dimensional code according to another embodiment of the present invention. The system 200 includes at least one mobile terminal 240. The mobile terminal 240 includes a processing module 256, a collecting module 242, a decoding module 244, an identifying module 246, an analyzing module 248, a memory 250, an I/O module 252, and a displaying module 254, wherein the mobile terminal 240 includes, but not limited to, mobile phone, PDA, Tablet PC and notebook; the memory 250 includes, but not limited to, internal memory, external memory, storage card, hard disk and externally attached storage device. In accordance with one example of the present invention, the collecting module 242 includes at least one CCD or CMOS camera.

The operational steps of the system 200 are similar to those of the system 100, except that in the system 100 the analysis on the multi-fields two-dimensional code is performed in the server 180 while all the operations are performed in the mobile terminal 240 in the system 200. In some embodiments of the present invention, the identifying module 246 and the memory 250 are both coupled to the I/O module 252 of the mobile terminal such that the modification, replacement, addition and delete of the information in the memory 250 and the rules in the identifying module 246 may be implemented. For example, in accordance with one embodiment of the present invention, the I/O module 252 may operate the identifying module 246 or the memory 250 by applying flag bit selection. However, this is only for illustrative purpose, and the present invention is not limited in this aspect. Those skilled in the art may understand that the rules may also be partially or totally stored in the Memory 250.

Figure 4:
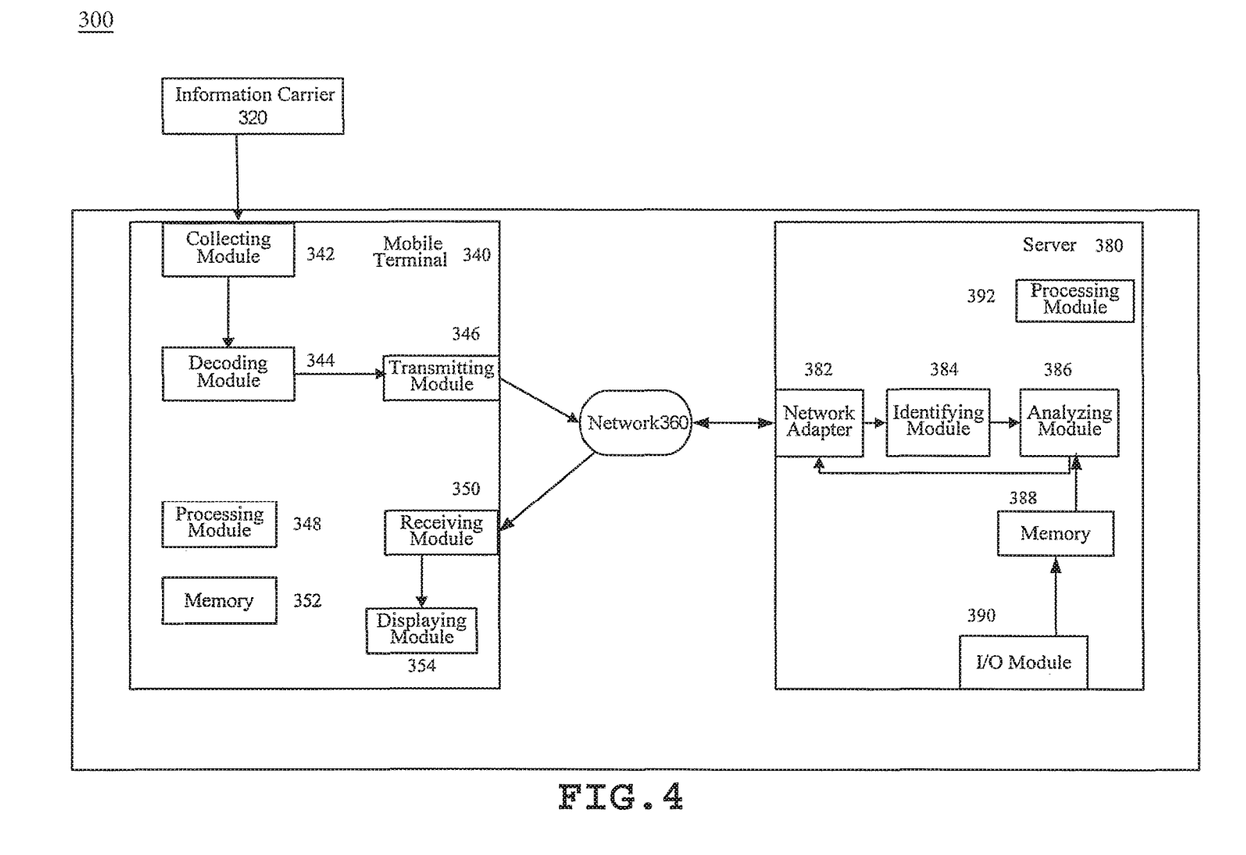
FIG. 4 illustrates a block diagram of a system 300 which is capable of collecting and analyzing a multi-fields two-dimensional code according to yet another embodiment of the present invention.

FIG. 4 illustrates a block diagram of a system 300 which is capable of collecting and analyzing a multi-fields two-dimensional code according to yet another embodiment of the present invention. The system 300 is similar to the system 100 except that the identifying module 384 is within the server in the system 300, while the identifying module 184 is within the mobile terminal in the system 100.

As described with respect to the system 100 above, a collecting module 342 collects an information carrier 320 (such as a multi-fields two dimensional code) into the mobile terminal 340 in an optical manner, and transfers the collected multi-fields two dimensional code to a decoding module 344 to perform decode, wherein the multi-fields two-dimensional code includes at least a first field and a second field, wherein the first field comprises information associated with a first part and a protocol of multiple protocols initialed by the first part, and the second field comprises information associated with at least one second part which is authorized by the first part to propagate and/or carry out the protocol of the multiple protocols, and wherein the first field includes a first sub-field containing information associated with the protocol of the multiple protocols initialed by the first part and a second sub-field containing information associated with the first part. The decoding module 344 transfers the decoded result to a transmitting module 346. The transmitting module 346 then sends the decoded result to a server 380 via a communication network 360.

In server 380, the decoded result is transferred to an identifying module 384 through a network adapter 382. Similarly to the description with respect to the system 100, the decoded result is identified and analyzed by the identifying module 384 and an analyzing module 386. The analyzing module 386 gives out a first or second result. The server 380 sends the result to a receiving module 350 of the mobile terminal 340 via the communication network 360. The receiving module 350 further transfers the first or second result to the displaying module 354 for displaying. In addition, in some embodiments of the present invention, a memory 388 and the identifying module 384 are both coupled to an I/O module 390 of the server 380 such that the modification, replacement, addition and delete of the information in the memory 388 and the rules in the identifying module 384 may be implemented. For example, in accordance with one embodiment of the present invention, the I/O module 390 may operate the identifying module 384 or the memory 388 by applying flag bit selection. However, this is only for illustrative purpose, and the present invention is not limited in this aspect. Those skilled in the art may understand that the rules may also be partially or totally stored in the Memory 388.

Figure 5:
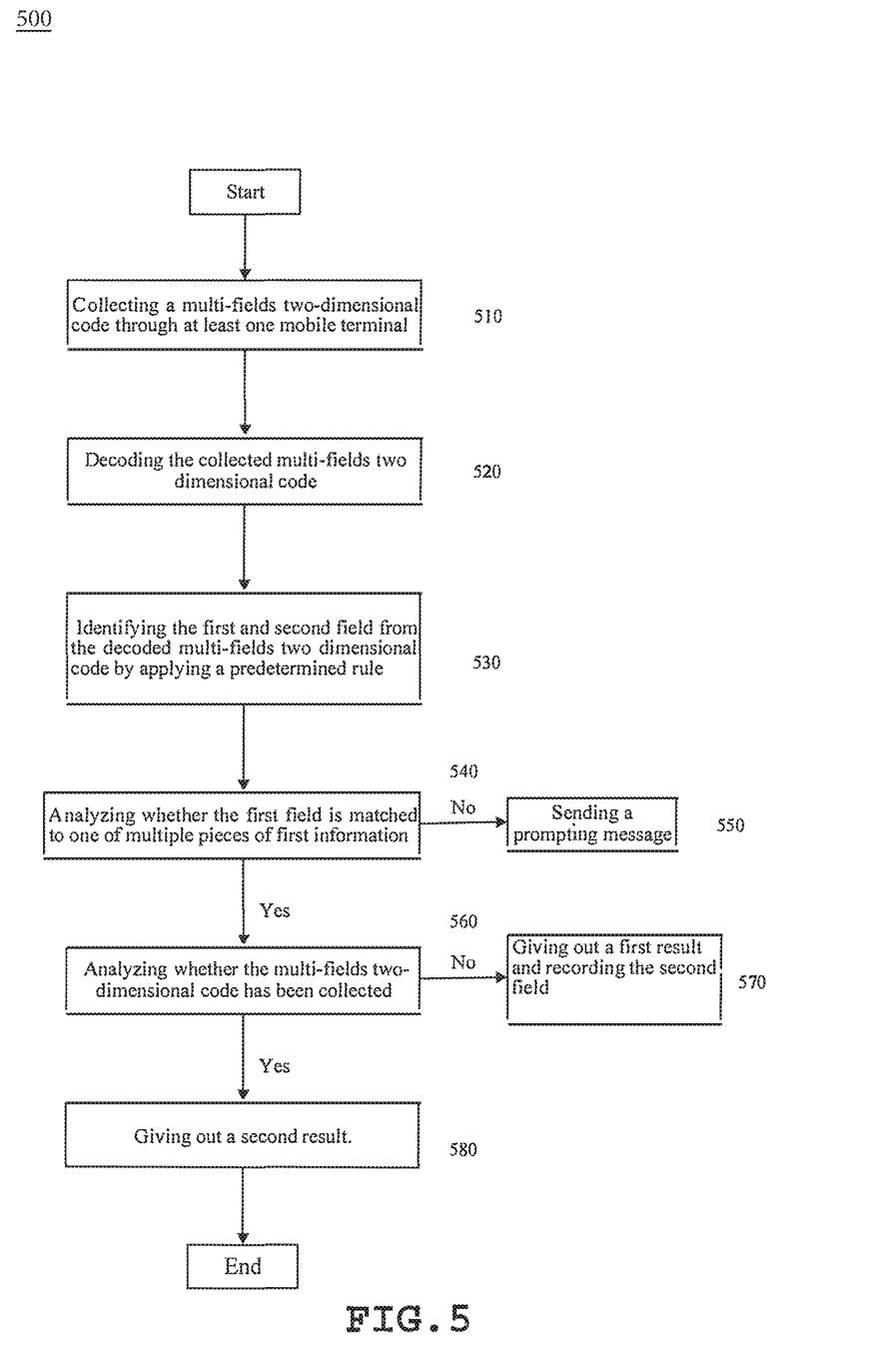
FIG. 5 illustrates a flow chart of a method for collecting and analyzing a multi-fields two-dimensional code according to an embodiment of the present invention.

Now refer to FIG. 5. As shown, FIG. 5 illustrates a flow chart 500 of a method for collecting and analyzing a multi-fields two-dimensional code according to an embodiment of the present invention. At step 510, a multi-fields two dimensional code is collected by a collecting module in an optical manner, wherein the multi-fields two-dimensional code includes at least a first field and a second field, wherein the first field comprises information associated with a first part and a protocol of multiple protocols initialed by the first part, and the second field comprises information associated with at least one second part which is authorized by the first part to propagate and/or carry out the protocol of the multiple protocols, and wherein the first field includes a first sub-field containing information associated with the protocol of the multiple protocols initialed by the first part and a second sub-field containing information associated with the first part. At step 520, the collected multi-fields two dimensional code is decoded. At step 530, to identify the first and the second fields from the decoded multi-fields two-dimensional code by applying a predetermined rule, wherein the predetermined rule includes, but not limited to, encryption arithmetic, Hash arithmetic, fields-distributing ratio rule and flag bit rule. Additionally, in accordance with another embodiment of the present invention, the applied rule may not be predetermined, but is instantly programmed through an I/O module.

At step 540, an analyzing module analyzes whether the received first field matches one of multiple pieces of first information in a memory. If it is not matched, a prompting message is sent at step 550. However, in accordance with other embodiments of the present invention, other different operations may be performed at step 550. Therefore, it is just for exemplary purpose and the present invention is not limited in this aspect. If it is matched, the analyzing module further analyzes at step 560 whether the second field has been collected. If it has not been collected, at step 570, a first result is given out, the second field is recorded, and the first result is displayed. If the second field has been collected, a second result is given out and displayed at step 580.

In accordance with the description about the embodiments of the present invention, those skilled in the art should appreciate that the present invention includes multiple modules which may be integrated together or may be discrete. Although the systems in the figures of the present invention include specific modules, some modules may be removed or additional modules may be added according to particular applications. The modules may be implemented in hardware circuit, or may be implemented in a combination of hardware and firmware, or in a combination of hardware circuit, firmware and software. At the same time, those skilled in the art may find out that the method and system of the present invention require relatively less network resource, storage space and computation resource for data to be collected and analyzed, therefore fast, accurate, flexible, prompt, and even real-time and individuated collection, analysis and monitoring of large scale complex information may be achieved.

Although the description herein is performed using the multi-fields two-dimensional code as an example of information carrier, person with skills in the art will recognize that the present invention may be applied to barcode, RFID tag and OCR-recognizable character in addition to the multi-fields two-dimensional code. Furthermore, it should be noted that the second field may also be divided into multiple sub-fields in a way similar to that of the first field, although it is not mentioned in the above description. Additionally, it should be clarified that the first and second sub-fields is just for illustrative purpose, and the first or second field may be divided into three or more sub-fields as desired in practice, therefore the present invention is not limited in this aspect, and the multi-fields two-dimensional code in the present invention may include three or more fields.

In large geographical scope, applying the method of the present invention for numerous collecting operations of a lot of users may conveniently obtain and instantly analyze information of multiple entities associated with individual fields of the multi-fields two-dimensional code simultaneously. For example, an enterprise may discover actual effects of individual promoters in time, and individual promoters may get feedbacks in time.

For example, the embodiments of the present invention may be applied to applications such as electronic coupons management to achieve efficient and low cost management of electronic coupons. As an example, codes of vendor, multiple promoters and coupon may be encoded into an information carrier such as a multi-fields two-dimensional code, wherein the first sub-field includes information about the code of the coupon, the second sub-field includes information about the code of the vendor, and the second field(s) includes information about promoter(s). By employing the embodiment of the present invention, functions of automatic statistics and recovery of coupons and count records for promoters may be achieved, so as to greatly improve uses of electronic coupons.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

Modifications may be made to the present invention according to the detailed description above. The terms used in the appended claims should not to be explained to limit the present invention to the specific embodiments disclosed in the specification and the claims. Rather, the scope of the present invention is to be determined by the appended claims, which are to be construed according to established doctrines of claim interpretation.

What is claimed is:

1. A computer-implemented method of analyzing multi-fields two-dimensional code, comprising:
   receiving decoded multi-fields two dimensional code;
   identifying a first field and a second field from the decoded multi-fields two dimensional code; and
   determining whether the first field of the multi-fields two-dimensional code matches one of multiple pieces of pre-stored first information and whether the second field of the multi-fields two-dimensional code has ever been collected before, for providing a result with respect to the decoded multi-fields two dimensional code.

2. The method of claim 1, wherein the first field comprises information associated with a first part and a protocol of multiple protocols initialed by the first part, and the second field comprises information associated with at least one second part which is authorized by the first part to propagate the protocol of multiple protocols.

3. The method of claim 2, wherein the first field of the multi-fields two-dimensional code includes a first sub-field containing information associated with the protocol of the multiple protocols initialed by the first part and a second sub-field containing information associated with the first part.

4. The method of claim 1, wherein identifying a first field and a second field from the decoded multi-fields two dimensional code comprises:
   identifying the first field and the second field from the decoded multi-fields two dimensional code by applying an encryption arithmetic rule, a Hash arithmetic rule, a fields-distributing ratio rule, or a flag bit rule.

5. The method of claim 1, wherein determining whether the first field of the multi-fields two-dimensional code matches one of multiple pieces of pre-stored first information and whether the second field of the multi-fields two-dimensional code has ever been collected before, for providing a result with respect to the decoded multi-fields two dimensional code comprises:
   in response to determining that the first field of the multi-fields two-dimensional code matches one of multiple pieces of pre-stored first information, determining whether the second field of the multi-fields two-dimensional code has ever been collected before; and in response to determining that the second field of the multi-fields two-dimensional code has not ever been collected before, providing a first result with respect to the multi-fields two-dimensional code and recording the second field of the multi-fields two-dimensional code.

6. The method of claim 5, further comprising:
in response to determining that the second field of the multi-fields two-dimensional code has ever been collected before, providing a second result with respect to the multi-fields two-dimensional code.

7. The method of claim 1, wherein the result with respect to the decoded multi-fields two dimensional code indicates validity of the decoded multi-fields two dimensional code.

8. A computer-implemented method of collecting and analyzing multi-fields two-dimensional code, comprising:
collecting the multi-fields two dimensional code in an optical manner;
decoding the collected multi-fields two dimensional code;
identifying a first field and a second field from the decoded multi-fields two dimensional code; and
determining whether the first field matches one of multiple pieces of pre-stored first information and whether the second field of the multi-fields two-dimensional code has ever been collected before, for displaying a result with respect to the multi-fields two-dimensional code.

9. The method of claim 8, wherein the first field comprises information associated with a first part and a protocol of multiple protocols initialed by the first part, and the second field comprises information associated with at least one second part which is authorized by the first part to propagate the protocol of the multiple protocols.

10. The method of claim 9, wherein the first field of the multi-fields two-dimensional code includes a first sub-field containing information associated with the protocol of the multiple protocols initialed by the first part and a second sub-field containing information associated with the first part.

11. The method of claim 8, wherein identifying a first field and a second field from the decoded multi-fields two dimensional code comprises:
identifying the first field and the second field from the decoded multi-fields two dimensional code by applying an encryption arithmetic rule, a Hash arithmetic rule, a fields-distributing ratio rule, or a flag bit rule.

12. The method of claim 8, wherein the multiple pieces of pre-stored first information are locally stored.

13. The method of claim 8, wherein the multiple pieces of pre-stored first information are obtained remotely via a network.

14. The method of claim 8, wherein determining whether the first field matches one of multiple pieces of pre-stored first information and whether the second field of the multi-fields two-dimensional code has ever been collected before, for displaying a result with respect to the multi-fields two-dimensional code comprises:
in response to determining that the first field matches one of multiple pieces of pre-stored first information, determining whether the second field of the multi-fields two-dimensional code has ever been collected before; and
in response to determining that the second field of the multi-fields two-dimensional code has not ever been collected before, displaying a first result with respect to the multi-fields two-dimensional code and recording the second field of the multi-fields two-dimensional code.

15. The method of claim 14, further comprising:
in response to determining that the second field of the multi-fields two-dimensional code has ever been collected before, displaying a second result with respect to the multi-fields two-dimensional code.

16. The method of claim 8, wherein the result with respect to the decoded multi-fields two dimensional code indicates validity of the decoded multi-fields two dimensional code.

17. An apparatus for collecting and analyzing multi-fields two-dimensional code, comprising: one or more processors and one or more memories coupled to the one or more processors and configured with instructions executable by the one or more processors to cause the apparatus to perform operations comprising:
collecting the multi-fields two dimensional code in an optical manner;
decoding the collected multi-fields two dimensional code;
identifying the first field and the second field from the decoded multi-fields two dimensional code; and
determining whether the first field matches one of multiple pieces of pre-stored first information and whether the second field of the multi-fields two-dimensional code has ever been collected before, for displaying a result with respect to the multi-fields two-dimensional code.

18. The apparatus of claim 17, wherein the first field comprises information associated with a first part and a protocol of multiple protocols initialed by the first part, and the second field comprises information associated with at least one second part which is authorized by the first part to propagate the protocol of the multiple protocols.

19. The apparatus of claim 17, wherein determining whether the first field matches one of multiple pieces of pre-stored first information and whether the second field of the multi-fields two-dimensional code has ever been collected before, for displaying a result with respect to the multi-fields two-dimensional code comprises:
in response to determining that the first field matches one of multiple pieces of pre-stored first information, determining whether the second field of the multi-fields two-dimensional code has ever been collected before; and
in response to determining that the second field of the multi-fields two-dimensional code has not ever been collected before, displaying a first result with respect to the multi-fields two-dimensional code and recording the second field of the multi-fields two-dimensional code.

20. The apparatus of claim 19, further comprising:
in response to determining that the second field of the multi-fields two-dimensional code has ever been collected before, displaying a second result with respect to the multi-fields two-dimensional code.

* * * * *